Aug. 4, 1964 H. G. MICHAEL 3,143,706

RADIO RECEIVER INPUT PROTECTIVE SELF-ACTUATED VARIABLE ATTENUATOR

Filed May 31, 1962

INVENTOR.
Harlan G. Michael
BY
Moody and Kietzinger
Attorneys

United States Patent Office 3,143,706
Patented Aug. 4, 1964

3,143,706

RADIO RECEIVER INPUT PROTECTIVE SELF-ACTUATED VARIABLE ATTENUATOR

Harlan G. Michael, Marion, Iowa, assignor to Collins Radio Company, Cedar Rapids, Iowa, a corporation of Iowa Filed May 31, 1962, Ser. No. 198,784
8 Claims. (Cl. 325—362)

Figure 1:
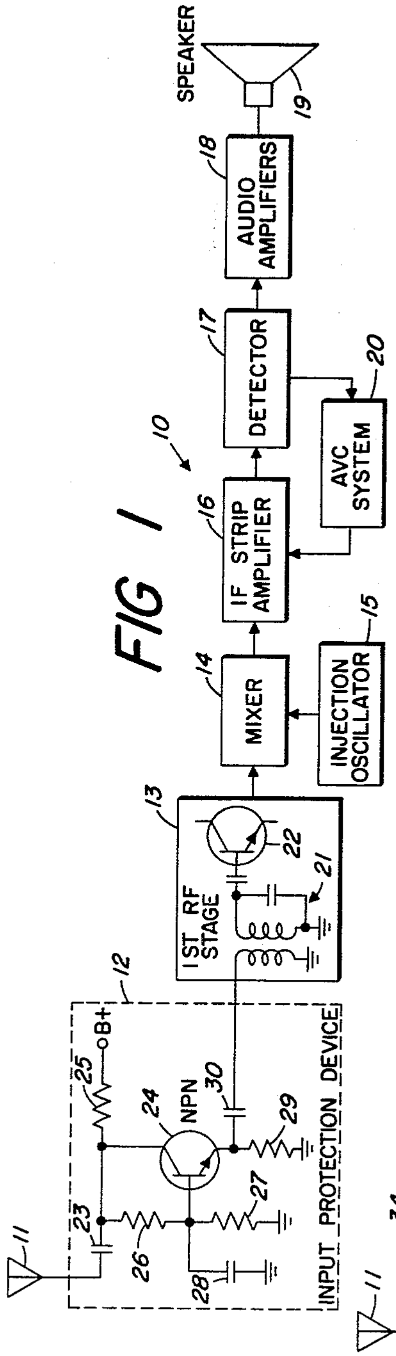

This invention relates in general to circuit overload protection systems, and in particular to a signal overload attenuating circuit for protecting receivers having a solid state RF stage against burnout from strong fields of nearby transmitters.

Whenever radio receivers are operated in the vicinity of high-powered transmitting equipment, there is a problem of possible burnout of radio frequency receiver input stages. A potential danger exists even though a transmitter in the vicinity is not operating on the same frequency as the receiving equipment. This has been such a problem with RF receivers that many solutions have been proposed and used to protect conventional vacuum tube type receiving equipment and also for more recently developed solid state RF receiving equipment. Such solutions have varied from a simple neon bulb limiter between the antenna and the RF receiver input circuits to more elaborate systems using thyratrons and silicon controlled rectifiers for actuating a relay and opening the receiver input line from the antenna. Many of these systems provide overload protection by complete circuit shutoff. However, with the advent of solid state RF equipment, such as transistorized receiving equipment which is particularly susceptible to damage or burnout of initial RF stages with even lower input signals from the antenna than with tube type receiving equipment, more sophisticated protective means are required for receiver input circuits. Further, it is important with the operation of many radio frequency receivers to have substantially continuous operation even though overload conditions may exist.

It is, therefore, a principal object of this invention to provide circuit overload protection by self-actuated variable attenuation with the level of attenuation automatically adjusted in accordance with the RF signal input received from the antenna. This prevents potentially damaging signal input voltage levels from reaching the receiver input stage.

A further object is to provide for substantially continuous RF receiver operation even though overload conditions exist and while providing automatic attenuation of the input signal from the receiver antenna.

A feature of this invention useful in accomplishing the above objects is the use of a single transistor which has been connected collector to antenna in such a manner as to become a self-actuated variable attenuator with automatically adjusted attenuation as determined by the input signal level received from the antenna in order that the receiver input stage never receives a damaging RF signal voltage. In this solid state attenuating circuit the collector to base transistor junction acts as a rectifier under signal overload conditions and provides a self-biased voltage between the emitter to base junction. This biasing voltage is of such a polarity that attenuation between the collector and the emitter electrodes of the transistor increases automatically with increasing overload input signal levels from the antenna.

The copending application of Dennis L. Fredrickson, Serial No. 197,342, filed May 24, 1962 entitled "Signal Input Overload Protection Attenuation Circuit for Transistor Receivers," and assigned to the assignee of the present invention presents related circuit systems. These provide overload protection by diode rectification voltage controlled attenuation through a transistor.

Specific embodiments representing what are presently regarded as the best modes of carrying out the invention are illustrated in the accompanying drawing.

Figure 3:
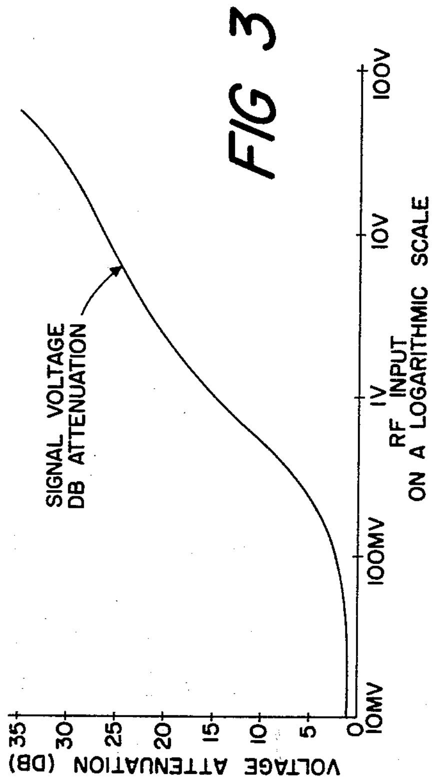
Figure 2:
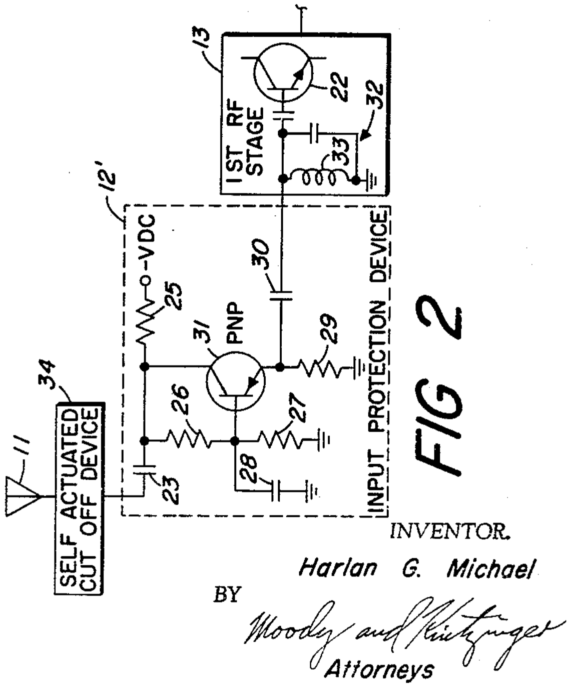

In the drawing:

FIGURE 1 represents an RF receiver having a solid state RF stage and provided with a self-actuated variable attenuation solid state overload protective circuit utilizing an NPN transistor;

FIGURE 2, another solid state signal overload self-actuated variable attenuating circuit utilizing a PNP transistor; and FIGURE 3, a semi-log graph of signal voltage attenuation in db to input signal voltage.

Referring to the drawing:

The embodiments shown are each illustrated as a circuit overload protective device for a radio frequency receiver. In each, the overload protective device is arranged for self-actuated variable attenuation to prevent potentially damaging signal input voltage levels from reaching the receiver RF input stage. Potentially damaging signal voltage levels may arise, for example, when the signal of a transmitter located relatively close to the receiving antenna results in excessive power input to the receiver circuit. In this invention a single transistor is connected collector to antenna, taking advantage of the relatively high collector voltage breakdown characteristic of transistors. Further, the transistor is connected in such a manner as to become a self-actuated attenuator with automatically adjusted attenuation as determined by the input signal received from the antenna. The collector to base transistor junction of this solid state attenuating circuit acts as a rectifier under signal overload conditions and provides a self-biased voltage between the emitter-to-base junction. The self-biased voltage between the transmitter emitter-to-base junction is of such a polarity that attenuation between the collector and the emitter electrodes increases automatically with increasing overload input signal voltage levels from the antenna. The transistor, resistor and capacitor components, and the voltage supplied are so chosen that the resulting attenuation of overload signal voltage levels provided by the input protective circuit prevents damaging RF signal voltage levels from reaching a receiver RF stage.

The superheterodyne receiver 10 of FIGURE 1 receives an RF signal from antenna 11. Antenna 11 is connected through input protective device 12 to RF stage 13, or stages, as the case may be. The output from the RF portion of the receiver is fed to mixer 14 where it is mixed with the high frequency signal of oscillator 15. The output of mixer 14 is fed to IF amplifier 16 and is passed successively through detector 17, and audio amplifier 18 to speaker 19. An AVC circuit 20 provides for applying an automatic volume control signal voltage, derived from detector 17, to the IF amplifier 16 in a conventional manner. The overload input protective device 12 provides for self-actuated variable attenuation with the level of attenuation automatically adjusted in accordance with the RF input signal received from the antenna. This prevents potentially damaging signal input voltage levels from reaching the receiver RF input stage 13. The output of input protective device 12 is shown to be coupled by transformer coupling network 21 to first RF stage amplifying transistor 22 in a conventional manner. With a solid state transistorized RF input stage 13 in receiver 10 the overload and burnout problem is multiplied, generally, from 10 to 20 times in severity from the overload problem encountered with a tube type RF input stage. It should also be noted that input protective device 12 will also provide much improved RF signal voltage overload protection for input circuits of tube type receivers.

Referring in greater detail to the receiver overload input protective device 12, a capacitor 23 is provided in the antenna feed line. The receiver 10 side of capacitor 23 is connected to the collector of NPN transistor 24. Both the capacitor 23 and the collector of transistor 24 are connected to the junction of resistors 25 and 26 which are serially connected along with resistor 27 between a positive voltage supply and ground. The base of transistor 24 is connected to the junction of resistors 26 and 27 and also to a plate of capacitor 28, the other plate of which is connected to ground. The emitter of transistor 24 is connected through resistor 29 to ground and also through capacitor 30 in an RF signal voltage line to the input coupling network 21 of first RF stage 13.

In operation protective device 12 is normally operated with transistor 24 in a saturated condition when there is no input signal voltage overload. Resistors 25, 26, 27, and 29 are so chosen and such a D.C. voltage is supplied as to provide normal operation with transistor 24 in the saturated state. The resistors referred to and the D.C. voltage supplied are so chosen that when the input signal voltage increases to a value exceeding the forward diode junction voltage of the collector to base junction, that junction begins to rectify the input signal through the low A.C. impedance of capacitor 28. This rectification charges capacitor 28 in such a direction that the voltage of the base of transistor 24 is lower than when the transistor is operated in the fully saturated state. Further, with increasingly strong input signal levels under overload conditions the voltage of the base of the transistor is correspondingly lowered. With a lowering of the voltage at the base of transistor 24 the base to ground voltage bias through the emitter and resistor 29 is decreased and the base to emitter portion of this bias is correspondingly lessened. Lessening of base to emitter voltage bias such as to remove transistor 24 from the fully saturated state results in a reduction of collector current, and variable attenuation through transistor 24 as a function of the RF signal voltage overload increase and the resulting decrease of base to emitter bias. This attenuation of the RF signal through the transistor 24 and attenuation of the RF signal voltage level out of the transistor emitter insures a safe signal voltage level input to the first RF stage 13 of the receiver.

To reiterate, at normal relatively low RF signal input levels the transistor is biased to the saturated state and allows the RF signal to be passed substantially unimpeded through the transistor to the output load of the emitter circuit. As the RF input signal increases to an overload condition the transistor collector base junction rectifies the signal and lessens the base-to-emitter junction bias to thereby remove the transistor from the saturated state, lessen collector current, and increase collector current, and increase collector-to-emitter resistance. This increased collector-to-emitter resistance acts as part of a voltage divider in reducing the signal reaching the emitter circuit load; in other words, attenuating the RF signal input to the first RF stage 13 to safe voltage levels. It should be noted that the circuit is completely automatic and is immediately returned to normal operation whenever all relatively strong RF input overload signals are removed.

Protection is provided for the input tuned circuits of the receiver from burnout by exceptionally strong signals near the receiver operating frequency. Hence, the overload input protective device 12 is a broadband voltage signal level sensing protective device. On occasion, therefore, an exceptionally strong signal off the receiver tuned frequency sensed by the receiver antenna creates an overload state actuating the signal attenuating protective device. Further, the off frequency signal may be so much stronger than the RF signal at the tuned frequency that resulting attenuation through the transistor 24 so attenuates and submerges the tuned signal input as to reduce it below the sensing level of the RF stages of the receiver. However, as a general rule hereinbefore stated, receiver 10 remains in substantially continuous operation even though overload conditions may exist, and particularly so if the overload is occasioned by an RF signal sensed by the antenna at the tuned frequency of the receiver.

Another limitation is that of the maximum input signals that can be handled by the overload protective device 12 imposed by voltage ratings and gain characteristics of the attenuating transistor. The collector to base reverse voltage breakdown point of the transistor must be higher than the anticipating voltage signal arriving from the antenna. For a given transistor emitter to base reverse breakdown voltage, a higher gain transistor will provide protection against higher signal levels since the transistor will have a greater voltage bias range in the emitter circuit. Overload protection will be provided with some transistors up to an overload signal voltage input as high as 100 volts. Should even higher signal overload input voltages be anticipated than can be handled by the transistor 24 utilized in input protective device 12, then a self-actuated cutoff device of a conventional nature may be inserted in the antenna input feed line as shown with the embodiment of FIGURE 2. Such an overload protective device would be preset to function on relatively high signal overload voltages to protect against overload signal voltages beyond the capabilities of the transistor used in input protective device 12.

Components used for testing such a signal overload device for a receiver include the following:

| | | |
|---|---|---|
| Capacitor **23** | μf | 0.01 |
| NPN transistor **24** | | 2N697 |
| Resistor **25** | ohms | 2200 |
| Resistor **26** | do | 5600 |
| Resistor **27** | kohms | 47 |
| Capacitor **28** | μf | 0.01 |
| Resistor **29** | ohms | 1200 |
| Capacitor **30** | μf | 0.01 |
| B+ voltage supplied | volts D.C. | +15 |

The attenuated voltage signal curve as illustrated in FIGURE 3 graphically portrays the attenuating protection provided form RF input overload signal voltages with an input protective device 12 utilizing the above identified components. The voltage attenuation db values plotted in the graph of FIGURE 3 were computed according to the formula $$\text{db}=20\log\frac{E\text{ in}}{E\text{ out}}$$

In the embodiment of FIGURE 2 wherein portions of the circuit not illustrated are the same as in the embodiment of FIGURE 1, similar components are, for the sake of convenience, numbered the same. In this embodiment a PNP transistor 31 is employed in place of the NPN transistor 24 of FIGURE 1. A minus voltage D.C. supply is applied to resistor 25 instead of the B+ voltage of FIGURE 1. In addition a tuned impedance coupling arrangement 32 utilizes a coil 33 in place of the signal coupling transformer portion in circuit 21 of FIGURE 1. Attenuating performance with this input protection device 12' gives substantially the same RF overload signal attenuating protection as provided by the input protective device 12 of the FIGURE 1 embodiment. Collector to base junction diode action with the PNP transistor 31, in rectifying overload input signals, charges capacitor 28 in the opposite direction in the embodiment of FIGURE 2 from the embodiment of FIGURE 1 so that the voltage of the base of transistor 31 is higher than when the transistor is operated in the fully saturated state. Further, with increasingly strong input levels under overload conditions the voltage of the base of the transistor is correspondingly raised. With such raise of the voltage at the base of transistor 31, the base to ground voltage bias through the emitter and resistor 29 is decreased and the base to emitter portion of this bias is correspondingly lessened. This results in overload attenuating action through transistor 31 comparable to overload attenuation provided through the transistor 24 of the overload protective device 12 in FIGURE 1.

Should even higher signal overload input voltages be anticipated than can be handled by the transistor 31 utilized in input protective device 12', then a self-actuated cutoff device 34 may be inserted in the antenna input feed line. This self-actuated cutoff device 34 would be one of those that may be preset to function (i.e., trigger to operation) on relatively high signal overload voltages to protect against excessive overload signal voltages beyond the capabilities of PNP transistor 31.

Whereas this invention is here illustrated and described with respect to several embodiments thereof, it should be realized that various changes may be made without departing from the essential contributions to the art made by the teachings hereof.

I claim:

1. A radio frequency signal voltage attenuating system for attenuating RF input voltages to desired RF signal voltage input levels to the following equipment including: a transistor having an emitter, base and collector; RF signal input means connected to the collector of said transistor for providing an RF input signal voltage path to the collector of said transistor; output means connected to the emitter of said transistor for the feeding of RF signal voltages to the following equipment; voltage circuit means including a D.C. supply, and a voltage divider network between the D.C. supply and a voltage reference, with resistive means connected between the collector and the base of said transistor, and additional resistive means connected between the base of said transistor and said voltage reference for the applying of bias between the collector and the base of said transistor and for providing voltage bias between the emitter and the base of the transistor; a D.C. blocking capacitor providing a low A.C. impedance path to the voltage reference from the base of said transistor; said transistor being so connected and so biased in the circuit as to provide rectification of RF signals above predetermined input levels applied at the collector through the common junction of the collector and base of the transistor to thereby vary the D.C. voltage level at the base of the transistor, consistent with the relative strength of the RF signal above the predetermined level, and to thereby vary the emitter base bias of the transistor and provide resultant variable attenuation of RF signal transmission from transistor collector input to transistor emitter output.

2. The RF attenuating system of claim 1, wherein said transistor is an NPN transistor; and said D.C. supply is a positive voltage supply.

3. The RF attenuating system of claim 1, wherein said transistor is a PNP transistor; and said D.C. supply is a negative voltage supply.

4. In a radio frequency receiving system having an antenna and a receiver with an RF amplifier; an RF input signal overload attenuating protective device inserted in the antenna to RF amplifier signal path; means providing an RF input signal voltage path from said antenna to said protective device; means for feeding RF signal output voltages from said protective device as an input to said RF amplifier; and with said protective device including: a transistor having an emitter, base, and collector; the RF signal input voltage path means from the antenna being connected to the collector of said transistor; the emitter of said transistor being connected by said output means for feeding the RF signal output voltages to said RF amplifier; said emitter also being connected through impedance means to a voltage reference; a D.C. supply; a voltage divider network, connected between the D.C. supply and said voltage reference, and including resistive means connected between the collector and base of said transistor, and additional resistive means connected between the base of the transistor and said voltage reference; and D.C. blocking means having low A.C. impedance connected between the base of said transistor and ground.

5. The radio frequency receiving system of claim 4, including a self-actuated cutoff device responsive to relatively high overload RF signal voltages included in said signal input means; and wherein said RF amplifier is provided with a transistorized input stage.

6. In the RF input signal overload attenuating protective device of claim 4, said voltage divider network also including resistive means between the D.C. supply and the collector of said transistor; D.C. blocking means in the RF input signal voltage path to said protective device; D.C. blocking means in said output means; and wherein said voltage reference is ground.

7. The protective device of claim 6, wherein said transistor is an NPN transistor; and said D.C. supply is a positive voltage supply.

8. The protective device of claim 6, wherein said transistor is a PNP transistor; and said D.C. supply is a negative voltage supply.

References Cited in the file of this patent

UNITED STATES PATENTS

| | | |
|---|---|---|
| 2,866,892 | Barton | Dec. 30, 1958 |
| 3,049,623 | Du Vall | Aug. 14, 1962 |
| 3,061,785 | Battin | Oct. 30, 1962 |